United States Patent Office 2,757,269
Patented July 31, 1956

2,757,269

PROCESS FOR BRAZING

Dean K. Hanink, Birmingham, and Robert F. Thomson, Grosse Pointe Woods, Mich., assignors to General Motors Corporation, Detroit, Mich., a corporation of Delaware No Drawing. Application April 1, 1953,
Serial No. 346,269

4 Claims. (Cl. 219—12)

This invention relates to brazing and more particularly, to a process for resistance brazing ferrous and non-ferrous alloys with powdered metallic brazing material. It has particular applicability to the manufacture of internal combustion engine valves and similar parts which are produced by bonding two or more parts together to form a unitary structure.

It has become conventional practice to manufacture internal combustion engine valves by butt welding the valve stem to the valve head. One of the difficulties with this method of fabrication is that a good butt weld can only be accomplished with certain types of alloys. Thus, the alloy composition of the valve is often dictated, not by the requirements for the finished article, but rather by the requirements for the fabrication process. Very frequently, the particular alloy which would be best suited to the physical and mechanical requirements of the finished valve cannot be used because of its non-suitability for butt welding.

Another difficulty of the conventionally used butt welding process is that it very often causes undesirable changes in the physical characteristics of the metal adjacent or at the bond due to changes in crystal structure caused by the high temperatures which are necessary to accomplish the weld.

These difficulties can be solved by substituting a brazing process for that of welding. By the use of a braze, alloys most suitable for the finished product can be chosen and since the heat required for brazing is not as great as that required for welding and is not high enough to forge the metal of the parts being joined, as is true in welding, no damage to the physical characteristics of the metal results.

We have found, however, that the conventional brazing methods which are in common use are not well suited to the high production output of fabricated metal articles such as internal combustion engine valves and the like.

It is, therefore, an object of this invention to provide an improved method for brazing which is highly advantageous for the high production manufacture of fabricated metal articles. More particularly, it is an object of this invention to provide a method for fabricating metal articles by means of a resistance brazing operation in which a powdered metal or metal alloy is used as the brazing material.

These and other objects are carried out in accordance with the invention by coating the metal surfaces to be joined with a mixture of powdered brazing material and an organic vehicle, pressing the coated surfaces into abutting relationship and then resistance brazing so as to form the junction.

Among the metal and metal alloys which are suitable as the brazing material are copper, copper-zinc, copper-aluminum, silver-zinc, silver-copper, silver-manganese and nickel-chromium-boron.

The organic vehicle should have sufficient viscosity to form a thick paint or a paste-like material with the powdered brazing material and should be of a composition which will readily volatilize or decompose into non-toxic and non-irritating gaseous substances when exposed to brazing temperatures. The vehicle should also be such as to leave no ash or residue after decomposition by high temperatures. Examples of such materials are the glycollic compounds such as ethylene glycol, diethylene glycol, propylene glycol or the like, lacquers, and liquid polymeric compositions such as liquid Lucite. When lacquers, or similar materials which harden when exposed to the air are used, the coating may be allowed to harden prior to the brazing operation.

Sufficient of the organic vehicle is uniformly mixed with the powdered brazing material to form a viscous paste or thick paint-like composition. The metal surfaces to be joined are then coated with this mixture and are tightly pressed together, after which the thus assembled metal article is subjected to an electric current of sufficient amperage and for sufficient time to fuse the braze material without causing fusion of the metal surfaces being joined. The heat generated by the resistance brazing operation volatilizes and decomposes the organic vehicle into gaseous substances which form a blanket adjacent the braze thereby protecting the fused metal from the atmosphere. By the time the braze is completed, the vehicle will have completely disappeared.

We have found it preferable to press the coated surfaces together during the brazing operation with a pressure between 1,000 and 2,000 lbs. per square inch, a pressure of approximately 1,500 lbs. per square inch providing excellent results. The use of high pressure may produce a higher strength joint as a result of more uniform distribution of heat generated at the contact surfaces when current is applied.

A brazing material which forms an excellent bond and which is highly suitable for use in fabricating ferrous as well as non-ferrous parts is Colmonoy, which is an alloy of from about 65% to 75% nickel, 13% to 20% chromium, 2.75% to 4.75% boron and a .1% maximum of iron, silicon and carbon. The difficulty with Colmonoy, however, is that its melting point and its bonding characteristics are greatly affected by the atmosphere when it is subjected to high temperatures. For this reason, it is present standard practice in brazing with Colmonoy to supply the necessary heat by means of a furnace in which there is a dry hydrogen atmosphere. This method is not only cumbersome and expensive, but is also unsuited to the economical high production manufacture of relatively low-cost metal fabrications such as valves and similar articles.

I have found the present invention to be particularly suitable for brazing with Colmonoy. By means of my improved process, a Colmonoy braze can be accomplished in the presence of the atmosphere, thus making unnecessary the expensive and time consuming step involving the use of a dry hydrogen or other reducing atmosphere. This may be due to the fact that the high temperature necessary to fuse the Colmonoy is accomplished in a much shorter time when resistance brazing with a mixture of the powdered metal and organic vehicle than when other heating means, such as a furnace, are used. The result is that the Colmonoy is subjected to the high temperatures for a much shorter period, thus allowing much less time for the undesirable chemical influence of the atmosphere to take place. Also, the vaporization and decomposition of the organic vehicle produces a protective gaseous blanket which further prevents the atmosphere from adversely affecting the Colmonoy.

To manufacture valves for internal combustion engines by resistance brazing with Colmonoy in accordance with this invention, we have used the following process.

The end surfaces of the valve stem and the valve head were first coated with a mixture of lacquer and powdered Colmonoy, there being sufficient lacquer in the mixture to bind the Colmonoy particles together to form a thick paste. The coated surfaces were then pressed together with a pressure of about 1,500 lbs. per square inch and a current of about 1,500 amperes per square inch was applied through the joint for about ½ to 1 second, after which time the vehicle had volatilized or burned off and the braze formed. After brazing, the valve was cooled and cleaned to remove excess brazing material and carbon deposits. In this particular instance, the valve stem consisted of AISI 8640 ferrous alloy containing about .38% to .43% carbon, .75% to 1.00% manganese, .40% to .70% nickel, .40% to .60% chromium, .15% to .25% molybdenum and the valve head a ferrous alloy designated N 155 and containing about .20% carbon, 20.0% chromium, 20.0% nickel, 3.00% molybdenum, 1.00% columbium, 2.5% tungsten, 20.0% cobalt, 33.50% iron. However, it is to be understood that the process may be used with other metals and metal alloys, it only being required that the fusion temperature of the parts to be joined be less than that of the powdered brazing material.

It is to be understood that, although the invention has been described with specific reference to a particular embodiment thereof, it is not to be so limited since changes and alterations therein may be made which are within the full intended scope of this invention as defined by the appended claims.

We claim:

1. A method of brazing comprising the steps of coating the metal surfaces to be joined with a viscous mixture of a powdered metallic brazing material and an organic vehicle, pressing the coated surfaces together with a pressure of at least 1000 lbs. per square inch and applying sufficient electric current through the junction of the two surfaces to cause the organic vehicle to be rapidly driven off in the form of gaseous substances thereby forming a protective blanket around the brazing material to prevent oxidation of the same and to fuse the brazing material.

2. A method of brazing comprising the steps of coating the metal surfaces to be joined with a viscous mixture of a powdered metallic brazing material and an organic vehicle, said brazing material being selected from the group consisting of copper, copper-zinc, copper-aluminum, silver-zinc, silver-copper, silver-manganese and nickel-chromium-boron, pressing the coated surfaces together with a pressure of from 1000 to 2000 lbs. per square inch and applying sufficient electric current through the junction of the two surfaces to cause the organic vehicle to be rapidly driven off in the form of gaseous substances thereby forming a protective blanket around the brazing material to prevent oxidation of the same and to fuse the brazing material.

3. A method of brazing comprising the steps of coating the metal surfaces to be joined with a viscous mixture of a powdered metallic brazing material and a completely combustible organic vehicle, pressing the coated surfaces together with a pressure of between 1,000 and 2,000 lbs. per square inch and applying an electric current of about 1500 amperes per square inch through the junction of the two surfaces to fuse the brazing material.

4. A method of brazing comprising the steps of coating the metal surfaces to be joined with a viscous mixture of a powdered alloy containing from 65% to 75% nickel, from 13% to 20% chromium and from 2.75% to 4.75% boron and an organic vehicle, pressing the coated surfaces together and applying an electric current through the junction of the two surfaces to fuse the brazing alloy.

References Cited in the file of this patent

UNITED STATES PATENTS

| | | |
|---|---|---|
| 2,200,742 | Hardy | May 14, 1940 |
| 2,223,312 | Briggs | Nov. 26, 1940 |
| 2,232,176 | Guthrie | Feb. 18, 1941 |
| 2,262,023 | Lytle | Nov. 11, 1941 |
| 2,291,399 | Miller | July 28, 1942 |
| 2,401,006 | Longoria | May 28, 1946 |
| 2,445,431 | Hill | July 20, 1948 |
| 2,551,244 | Clark | May 1, 1951 |
| 2,576,793 | Jordan | Nov. 27, 1951 |
| 2,612,459 | Willard | Sept. 30, 1952 |